US006066302A

United States Patent [19]

Bray

[11] Patent Number: 6,066,302

[45] Date of Patent: May 23, 2000

[54] METHOD OF SEPARATION OF CESIUM-131 FROM BARIUM

[76] Inventor: Lane A. Bray, 67 Park, Richland, Wash. 99352

[21] Appl. No.: 09/301,640

[22] Filed: Apr. 28, 1999

[51] Int. Cl.[7] .............................. C01D 17/00; G21G 4/00

[52] U.S. Cl. ................................ 423/2; 423/249; 376/189

[58] Field of Search ................ 423/2, 249; 250/432 PD; 376/189

[56] References Cited

PUBLICATIONS

Harper et al, Proc. Intern. Conf. Peaceful Uses At. Energy, 2d, Geneva:417–22 (1958).

Buchanan et al, ORNL–IIC–10(1):298–314 (1968).

Finkle et al, Nuclear Energy Ser., Div. IV, 9, Book 3:1654–56(1951).

*Primary Examiner*—Ngoclan Mai

*Attorney, Agent, or Firm*—Liebler, Ivey & Connor; Steven J. Staihar

[57] ABSTRACT

A method of producing and purifying Cs-131 comprising the steps of dissolving irradiated Ba comprised of natural or enriched Ba including Ba-130, Ba-131, and Cs-131 from the decay of Ba-131, in an acid, precipitating the Ba, separating the Cs-131 using an ion exchange media, and eluting the Cs-131 from the exchanger to recover the purified Cs-131.

19 Claims, 1 Drawing Sheet

METHOD OF SEPARATION OF CESIUM-131 FROM BARIUM

FIELD OF THE INVENTION

The present invention relates generally to a method of separating Cesium-131 (Cs-131) from Barium and further purifying the Cs-131 for applications including but not limited to cancer research and treatment.

BACKGROUND OF THE INVENTION

The widespread recognition of the use of radiation to kill or neutralize unwanted cell growth such as cancer has led to increasing interest in various types of radionuclides. In particular, Cs-131 has been identified as a radionuclide that is ideally suited for use in brachytherapy (cancer treatment using interstitial implants, i.e. "radioactive seeds"). The short half-life makes the seed effective against faster growing tumors such as those found in the brain, lung, prostate, and other sites.

Cesium-131 is produced by radioactive decay from neutron irradiated naturally occurring Ba-130 (natural Ba comprises about 0.1% Ba-130) or from enriched Ba containing additional Ba-130, which captures a neutron, becoming Ba-131. Ba-131 decays with an 11.5 day half-life to Cs-131, which decays with a 9.7 day half-life to stable Xenon-130.

In order to be effective, the Cs-131 must be exceptionally pure, i.e., free from other metals and radioactive ions including Ba-130 and Ba-131.

Harper et al., in *Proc. Intern. Conf. Peaceful Uses At. Energy, 2nd*, Geneva:417–22 (1958) described a distillation of Cs-131 from irradiated barium at 850° C.

Buchanan et al., ORNL-IIC-10(1):298–314 (1968) described a recovery of Cs-131 by passing an acid solution of neutron irradiated barium carbonate through an ion exchange column containing a mixture of ammonium molybdophosphate (AMP) and acid washed asbestos. Cesium absorbed on the AMP and barium and other impurities passed through the column. After rinsing the column with dilute acid, then water, the AMP was dissolved and separated from the asbestos by passing a LiOH solution through the column. Cesium remained on the asbestos. After rinsing LiOH from the asbestos with water, Cs-131 was eluted with dilute acid.

Finkle et al., Nuclear Energy Ser., Div. IV, 9, Book 3:1654–56 (1951) in Finston et al., NAS-NS 3035: 56–57 (1961) described a preparation of Cs-131 by preparing a clean Ba source, dissolving $BaCl_2$ in $H_2O$, re-precipitating $BaCl_2 \cdot H_2O$ with HCl, boil supernatant solution to dryness, dissolve in $H_2O$ and scavenge twice with 5 mg $La(OH)_3$, evaporate tracer solution to dryness several times with aqua regia to remove ammonium salts, leaving solid-free 10.2 d Cs-131 activity. Reported overall yields were about 30%.

Shabana et al., *J. Radioanal. Chem.* 43:21–29 (1978) reported the absorption of Na, Cs, and Ba on Dowex 1X8 resin from solutions comprising various concentrations of HCl and $HNO_3$ and water-miscible organic solvents including methanol, ethanol, isopropanol, acetone, and dioxan.

Kubica et al., *J. Radioanal. Nucl. Chem. Lett.* 213(6): 411–18 (1996) reported the sorption of Fr, Ra, Cs, and Ba on nickel hexacyanoferrate (II) composite ion exchanger from HCl solutions as a function of concentration and from EDTA solutions as a function of hydrogen ions concentration.

The articles referred to herein are provided herewith in an Information Disclosure Statement in accordance with 37 CFR 1.97.

SUMMARY OF THE INVENTION

The present invention discloses a method of separating Cs-131 from a salt, mixture, or a solution of radionuclides comprised of natural or enriched Ba including Ba-130, Ba-131 and its daughter product Cs-131. As used herein, the term solution is a subset of the term mixture in accordance with standard definitions. The method comprises the steps of dissolving a quantity of neutron-irradiated barium, comprised of natural or enriched barium including Ba-130, Ba-131 and Cs-131 formed by radioactive decay of Ba-131, in an acid and preferably an organic acid, for example acetic acid, to form a solution. The neutron-irradiated barium may be in the form of any barium salt or target material that would be recognized by one of ordinary skill in the art, which includes but is not limited to, barium carbonate ($BaCO_3$) powder, barium oxide (BaO), or barium metal.

The barium is then separated from the solution. This may be accomplished by precipitation by adding, for example, a salt. A salt is preferred that reacts to produce a barium compound that is stable in the hostile reactor environment, does not produce other interfering radionuclides, and is easily dissolved without producing other interfering cations or anions. A saturated solution of a carbonate salt, for example, sodium carbonate ($Na_2CO_3$), may be added to the solution to adjust the pH of the solution to a value preferably between about 7 and 10 to precipitate the barium. Besides carbonate salts, those of ordinary skill in the art will recognize that other salts may be used as including but not limited to citrate, chloride, nitrate, oxalate, and sulfate salts.

The pH of the solution may then be adjusted to a value between about 11 and 14 and preferably to a value between about 13 and 14. This may be accomplished by adding a pH-modifying substance such as sodium hydroxide (NaOH) to the solution, composed of Cs-131 and the Ba precipitate, to adjust the pH to a value between about 11 and 14. The solution comprising the Cs-131 and the Ba precipitate may then be filtered or centrifuged to separate the Ba precipitate from the filtrate comprising Cs-131. Those of ordinary skill in the art will recognize that other methods and apparatuses of separating the Ba precipitate from the solution may work as well. The Ba precipitate may be washed to remove traces of Cs-131 adhered to the precipitate. The separated Ba precipitate may be recycled, when additional Cs-131 is formed by the radioactive decay of Ba-131, by dissolving the Ba in acid and repeating the steps above.

The filtrate comprising the Cs-131 may be passed through an ion exchange media, including but not limited to an ion exchange column, wherein the Cs-131 is retained on the ion exchanger and the remaining solution passes through. After washing the column to remove any remaining salt solution, the Cs-131 may be eluted from the exchanger. Elution may be accomplished using an acid. The elution acid may be $HNO_3$, HCl, and $HC_2H_3O_2$ and any other elution acid that would be recognized by one of ordinary skill in the art. The acid solution containing the Cs-131 may be used as is or evaporated to dryness.

DETAILED DESCRIPTION OF THE PREFERRED EMBODIMENT(S)

Figure 1:
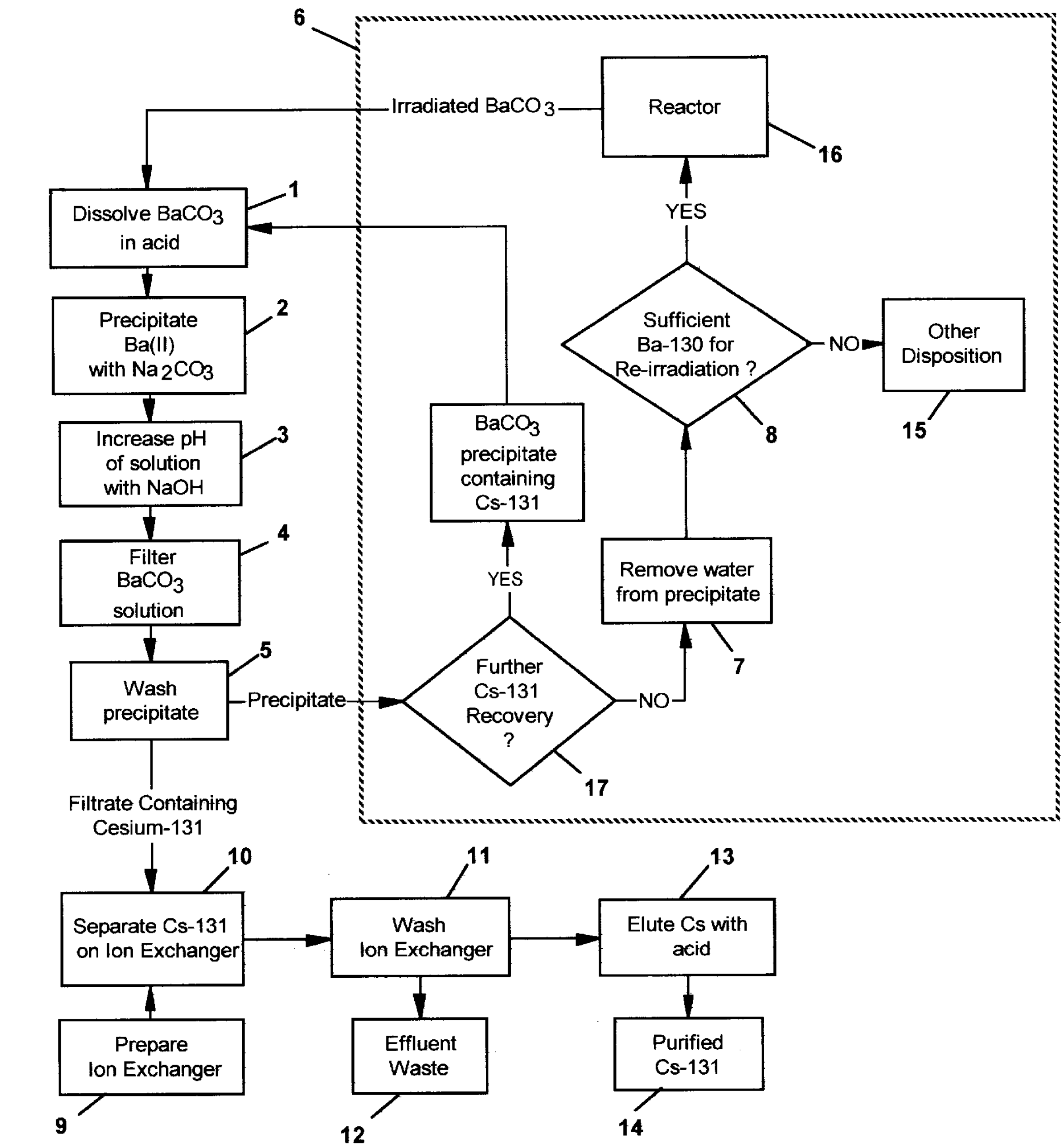
FIG. 1 is a process flow diagram depicting the preferred embodiment of the process steps.

FIG. 1 illustrates the preferred embodiment of the invention comprising the steps of 1 dissolving a quantity of neutron-irradiated $BaCO_3$ powder comprised of natural or enriched Ba, Ba-131 and Cs-131 formed by radioactive decay of Ba-131 (a typical irradiation of natural Ba yields approximately $7\times10^{-8}$ g Cs per g Ba), in acetic acid ($HC_2H_3O_2$), thereby forming a solution comprising barium acetate [$Ba(C_2H_3O_2)_2$], cesium acetate ($CsC_2H_3O_2$), water, and carbon dioxide ($CO_2$). Besides $BaCO_3$, any other target salts could be used that would be recognized by one of ordinary skill in the art, including but not limited to barium oxide (BaO) and barium metal. However, the carbonate form is stable to neutron irradiation. The use of acetic acid was selected to obtain the maximum salt dissolution per unit volume of solution. However, one of ordinary skill in the art will recognize that other organic or inorganic acids may be used, but may result in a larger solution volume. Ba(II) has a limited solubility in an excess of most mineral acids, e.g., HCl, $H_2SO_4$, or $HNO_3$. The reaction may be represented by the following equation:

$$BaCO_3+Cs_2CO_3+4HC_2H_3O_2\rightarrow Ba(C_2H_3O_2)_2+2CsC_2H_3O_2+2H_2O+2CO_2\uparrow$$

The barium may then be separated. A sodium carbonate ($Na_2CO_3$) solution may be added 2 to precipitate the $Ba(C_2H_3O_2)_2$ as $BaCO_3$ . The $Na_2CO_3$ is preferably added in a quantity sufficient to precipitate the Ba(II) by adjusting the pH to a value preferably within the range of about 7 and 10. The Cs(I) will stay in solution at this pH range (the solubility of $BaCO_3$ is about 0.002 g/100 mL $H_2O$). Although $Na_2CO_3$ was selected to precipitate Ba(II), other carbonate salts as recognized by those of ordinary skill in the art can be used including but not limited to $(NH_4)_2CO_3$, $K_2CO_3$ or $Li_2CO_3$. Besides carbonate salts, those of ordinary skill in the art will further recognize that other compounds may be used including but not limited to citrate, chloride, nitrate, oxalate, and sulfate salts. A salt is preferred that reacts to produce a barium compound that is stable in the hostile reactor environment, does not produce other interfering radionuclides, and is easily dissolved without producing other interfering cations or anions. NaOH was not used to precipitate the Ba(II) because it forms a gelatinous precipitate at a pH of about 7 that is difficult to filter. The reaction may be represented by the following equation:

$$Na_2CO_3+Ba(C_2H_3O_2)_2+CsC_2H_3O_2\rightarrow BaCO_3+2NaC_2H_3O_2+Cs(I)+H_2O+CO_2\uparrow$$

Any excess $Na_2CO_3$ reacts with the $HC_2H_2O_2$ to form $NaC_2H_3O_2$:

$$Na_2CO_3+2HC_2H_2O_2\rightarrow 2NaC_2H_3O_2+H_2O+CO_2\uparrow$$

The pH of the solution composed of Cs-131 and the Ba precipitate may be adjusted 3 to a value between about 11 and 14 and preferably to a value between about 13 and 14 to optimize the ion exchange recovery of Cs-131. This may be accomplished by adding sodium hydroxide (NaOH). One of ordinary skill in the art will recognize that other pH-modifying substances besides NaOH can be used, including but not limited to $NH_4^+$–, $K^+$–, or LiOH.

The $BaCO_3$ precipitate comprising natural or enriched Ba, Ba-131 and Ba-130 may then be separated, for example by filtration 4 or centrifugation, from the remaining solution or filtrate comprising the Cs-131. One of ordinary skill in the art will recognize that other methods and apparatuses of separating the Ba precipitate from the solution may work as well. The $BaCO_3$ precipitate may be washed 5 to remove traces of Cs-131 adhered to the precipitate, after which the $BaCO_3$ precipitate may be recycled 6 for further production and purification of Cs-131. Even after the $BaCO_3$ has been separated from the Cs-131 solution, the radioactive Ba-131 continues to decay ($t_{1/2}$=12 days) into its daughter product Cs-131 which again establishes equilibrium. Thus, the steps set forth above can be repeated using the $BaCO_3$ precipitate. It must first be determined 17 whether further recovery of Cs-131 is possible from the $BaCO_3$ precipitate. If further recovery of Cs-131 is possible, the $BaCO_3$ precipitate comprising the Cs-131 can be re-dissolved in acid, the Ba(II) can be reprecipitated as $BaCO_3$ with saturated $Na_2CO_3$, the pH can be adjusted to a value between about 11–14, and the $BaCO_3$ precipitate can be again separated. The cycle can be repeated until the Ba-131 value is too low to productively produce additional Cs-131. If further recovery of Cs-131 is not possible, the $BaCO_3$ precipitate may then be heated to a temperature above approximately 400° C. to drive off water 7. It may then be determined 8 whether there is sufficient Ba-130 for re-irradiation. If there is sufficient Ba-130 for re-irradiation, the $BaCO_3$ can be returned to the nuclear reactor 16 for additional irradiation after which the $BaCO_3$ can be re-dissolved in acid and the process steps again repeated to separate the Ba from the solution comprising the daughter Cs-131. If there is insufficient Ba-130 for re-irradiation, the precipitate may otherwise be disposed of 15. The cycle may be repeated until the Ba-131 value is too low to productively produce additional Cs-131.

The Cs-131 is separated from the filtrate solution comprising sodium acetate, sodium hydroxide, and a trace amount of Ba(II) and other possible chemical and radiochemical impurities, by passing the solution through an ion exchanger 10. The selection of an ion exchanger to separate the Cs-131 is based on an exchanger that will preferentially extract Cs(I) from the filtrate salt solution. Several organic and inorganic ion exchangers are available. An ion exchanger is preferred that has a large Cs(I) distribution value (Cs Kd) and has no capacity for traces of Ba(II) or other metallic ions in the presence of monovalent ions such as , $Na^+$, $K^+$, or $NH_4^+$. SuperLig®644 polymer resin (SL-644) is a covalently bound macrocycle containing a sequestering ligand prepared by IBC Advanced Technologies (American Fork, Utah), that has been shown to be highly selective for cesium in the presence of excess potassium or sodium at a pH value of approximately 13. Other exchangers that could be used include Duolite® CS-100, a phenol-formaldehyde resin available from Rohm and Haas; and RF, a resorcinol-formaldehyde organic resin, from Boulder Scientific, Mead, Colo. However other exchangers could be used as recognized by those of ordinary skill in the art. Most inorganic ion exchangers are not recommended because of the difficulty in eluting the Cs-131 from the exchanger.

After passing the filtrate solution through the column, the exchanger may be washed 11 to remove any salt solution 12 including any trace amounts of barium. The washing may be done with a NaOH solution comprising a pH of about 13, but is not limited to NaOH and those of ordinary skill in the art will recognize that other substances will work as well.

The Cs-131 bound by the exchanger is then eluted 13. It is preferred that 0.5 M acid be used to elute the Cs-131 but those of ordinary skill in the art will recognize that other concentrations will work as well. The acid may be, but need not be limited to $HNO_3$, HCl, or $HC_2H_3O_2$ and those of ordinary skill in the art will recognize that other acids will work as well.

The acid solution 14 comprising the highly purified Cs-131 may be used as is or evaporated to dryness.

EXAMPLE A

In experiments to demonstrate the separation and purification of Cs, 40 g of $BaCO_3$ mixture in powder form comprising a quantity of cesium was dissolved 1 in 130 mL of 4M acetic acid (~30% in excess acid) for ~80 minutes using a magnetic stir bar to stir the solution at a temperature of 50° C. to 70° C. About 175 mL of 3M $Na_2CO_3$ was then added 2 to the solution with stirring to adjust the solution to a pH>10, and to precipitate $BaCO_3$. The solution comprising the $BaCO_3$ precipitate and Cs was then adjusted 3 to a pH of about 14 by adding 16.7 mL of 19M NaOH. The solution was then vacuum filtered 4 using a glass medium-porosity Buchner funnel to separate the precipitated $BaCO_3$ from the solution comprising the barium and cesium. (A Corning brand 250 Filter System, #43077, 0.45 $\mu$m, nylon membrane was also successfully tested). The $BaCO_3$ precipitate was then washed 5 with 10 mL of water containing 1 g $Na_2CO_3$ adjusted to a pH of 13 with NaOH, to separate traces of cesium adhered to the $Ba_2CO_3$ precipitate. The final cesium-containing filtrate volume was ~300 mL. Approximately 90% of the Cs was recovered from the $BaCO_3$ target material.

An ion exchange column of approximately 1 $cm^3$ in volume (2 cm long by ~0.8 cm in dia.) was prepared 9 and contained approximately 0.57 g of IBC SL-644® Exchanger, 100–200 mesh. The exchanger was pre-cycled through 1M NaOH, followed by $H_2O$, followed by 0.5M $HNO_3$ several times, to remove any unbound macrocycle. The solution filtrate comprising cesium was then fed 10 through the column at ~10–20 mL per hour (10–20 column volumes [CV] per hour). After passing the filtrate through the column, the column was washed 11 with 5 CV of pH 13 water to remove any unwanted ions. The cesium was retained on the exchanger. The effluent, containing traces of Ba and other unwanted ions, was transferred to waste 12. The purified cesium was recovered from the 1 $cm^3$ ion exchanger by 13 passing ~15 mL of 0.5M $HNO_3$ through the column at 1–5 CV per hour. The purified cesium product 14 was analyzed. Approximately, 97% of the initial cesium in the starting ion exchange feed was recovered in the final product. The overall cesium recovery was 80–90%.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A method for purifying Cs-131 comprising the steps of:

a. dissolving a quantity of barium comprised of Ba-131 and Cs-131 formed by radioactive decay of Ba-131 in an acid to form a solution;

b. separating the barium from said solution, c. separating the Cs-131 from said solution.

2. The method of claim 1 wherein the barium is separated from the solution by precipitating said barium.

3. The method of claim 2 wherein the barium is separated from the solution by adding a salt to said solution to thereby precipitate the barium.

4. The method of claim 3 wherein the salt is added in an amount sufficient to precipitate the barium and to adjust the pH of said solution to a value between about 7 and 10.

5. The method of claim 3 wherein said salt is a carbonate salt.

6. The method of claim 1 wherein the step of separating the Cs-131 from said solution comprises passing the solution through an ion exchanger.

7. The method of claim 6 wherein the separation of Cs-131 from said solution comprises the steps of a. adjusting the pH of the solution to a value between about 11 and 14;

b. passing said solution through an ion exchange column whereby said ion exchange column retains the Cs-131 and passes the remaining solution.

8. The method of claim 7 wherein said ion exchange column is an SL-644 exchange column.

9. The method of claim 7 wherein said ion exchange column is an CS-100 exchange column.

10. The method of claim 7 wherein said ion exchange column is an RF exchange column.

11. The method of claim 7 further comprising the step of recovering the Cs-131 from the ion exchange column by eluting the Cs-131.

12. The method of claim 11 wherein Cs-131 is eluted with an acid.

13. The method of claim 12 wherein said acid is selected from the group consisting of acetic acid, hydrochloric acid, and nitric acid.

14. The method of claim 1 further comprising the step of recycling the separated barium by repeating steps a–c of claim 1 with the separated barium.

15. The method of claim 1 wherein the acid is an organic acid.

16. The method of claim 1 wherein the acid is acetic acid.

17. The method of claim 7 wherein the pH of the solution is adjusted to a value between about 11 and 14 before the barium is separated from said solution.

18. The method of claim 14 further comprising the steps of a. removing water from the separated barium;

b. re-irradiating the separated barium.

19. The method of claim 2 further comprising the step of removing Cs-131 from said precipitate.

* * * * *